US007487384B2

(12) United States Patent
Bhat et al.

(10) Patent No.: US 7,487,384 B2
(45) Date of Patent: Feb. 3, 2009

(54) ANALYSIS OF PIPELINED NETWORKS

(75) Inventors: Thirumalesh Bhat, Bellevue, WA (US);
Mark Wodrich, Kirkland, WA (US);
Evan C. Cacka, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/953,814

(22) Filed: Dec. 10, 2007

(65) Prior Publication Data
US 2008/0148099 A1 Jun. 19, 2008

Related U.S. Application Data

(63) Continuation of application No. 11/093,913, filed on Mar. 30, 2005, now Pat. No. 7,308,597, which is a continuation of application No. 10/144,053, filed on May 10, 2002, now Pat. No. 6,993,683.

(51) Int. Cl.
*G06F 11/00* (2006.01)
(52) U.S. Cl. .......................................................... 714/4
(58) Field of Classification Search ...................... 714/4
See application file for complete search history.

(56) References Cited

U.S. PATENT DOCUMENTS

| 5,889,520 A | 3/1999 | Glaser |
| 6,105,067 A | 8/2000 | Batra |
| 6,314,512 B1 | 11/2001 | Branson |
| 6,714,962 B1 | 3/2004 | Helland |
| 6,772,363 B2 | 8/2004 | Pedone |
| 2002/0004827 A1 | 1/2002 | Ciscon |
| 2002/0129294 A1 | 9/2002 | Pedone |
| 2004/0073651 A1 | 4/2004 | Beaulieu |
| 2004/0141507 A1 | 7/2004 | Michel |

OTHER PUBLICATIONS

Rigney, C., et al., "Remote Authentication Dial In User Service (RADIUS)," Network Working Group RFC 2865, Jun. 2000, <http://www.ietf.org/rfc/rfc2865.txt>.
Rigney, C., "RADIUS Accounting." Network Working Group RFC 2866, Jun. 2000, <http://www.ietf.org/rfc/rfc2866.txt>.

*Primary Examiner*—Michael C Maskulinski
(74) *Attorney, Agent, or Firm*—Wolf, Greenfield & Sacks, P.C.

(57) ABSTRACT

This invention relates to a diagnostic tool for networks that process messages in stages such as pipelined networks. In a pipelined network comprising tiers of servers, each tier of servers communicates only with adjacent tiers in a communications flow that processes messages in a sequence of tiers. The tool requires a controller located locally with respect to the pipelined network for generating messages to be processed by the pipelined network. Communication paths connect the controller to each tier of the pipelined network. A program executing at the controller detects a failure of the processing of the message by the pipelined network and receives diagnostic information from the tiers after the failure is detected. The diagnoses based on the retrieved information can proceed either manually or automatically, depending on how the information is collected. In order to automate the diagnosis, the program executing on the controller includes commands for sequentially analyzing each tier in the pipelined network in order to isolate the tier in which the failure occurred. For manual diagnosis, the program includes commands for simultaneously (or almost simultaneously) requesting information from each tier upon network failure. In the manual approach, distributed agents at all of the tiers gather information about the operating of the tier at the time of network failure.

12 Claims, 5 Drawing Sheets

ANALYSIS OF PIPELINED NETWORKS

CROSS-REFERENCE TO RELATED APPLICATIONS

This application is a continuation of application Ser. No. 11/093,913, filed Mar. 30, 2005 (now U.S. Pat. No. 7,308,597), which in turn is a continuation of application Ser. No. 10/144,053, filed May 10, 2002 (now U.S. Pat. No. 6,993,683), priority from which is claimed pursuant to 35 U.S.C. § 120.

TECHNICAL FIELD

This invention relates generally to error diagnosis in a network and, more particularly, relates to facilitating a sequential analysis of a pipelined network in response to network errors in order to isolate and troubleshoot the problem.

BACKGROUND

As the Internet has grown from a few servers controlled by the government and a few educational institutions into a vast, heterogeneous network of servers and clients, the demands on servers and a corresponding interest in computer security have grown as well. As a result, servers have become more and more specialized, and networks have become more efficient, providing limited functionality to limited sets of users. In the interests of computer security, the sensitive information stored on servers has also been moved farther away from those users, and requests to access or manipulate that data must often pass through specialized tiers of servers before communicating with the machines actually carrying the data. These pipelined networks of servers allow efficient, non-duplicative access by multiple users, and ensure that users do not have prohibited direct access to important data.

One example of such a pipelined server network is used for the deployment of remote-access technologies. Typically, a group of functionally similar remote access servers accepts dial-up or virtual private network (VPN) connections from users desiring to remotely access an intranet. Before granting the users access to the network, these remote access servers (RAS), comprising the first tier, use the remote authentication dial-in user service (RADIUS) protocol to communicate with RADIUS servers handling authentication and authorization requests. This second tier of RADIUS servers communicates with domain controllers (DCs) in the pipelined server network in order to verify the users' credentials and uses lightweight directory access protocol (LDAP) to retrieve user and group settings from the DCs.

To make matters more complex, these remote-access deployments include RADIUS proxy servers for performing load-balancing and fault avoidance functions between RAS servers and the primary RADIUS servers. Thus, in these pipelined server networks, users are separated from credentialing settings by four tiers of servers: RAS servers, which communicate with RADIUS proxy servers, which communicate with RADIUS servers, which in turn communicate with DCs.

The architectural complexity of these pipelined server networks makes it difficult to troubleshoot and diagnose errors. This difficulty is due to several factors, including the variety of systems involved in a typical transaction, the many possible routes taken by a given request and the many possible points of failure, as well as the sporadic and often irreproducible nature of the errors. Existing diagnostic tools are unable to adequately troubleshoot such complex server networks and, in particular, are limited in their ability to pinpoint a typical problem. Thus, a system administrator faced with the task of troubleshooting a network failure confronts a tedious, time-consuming and often intractable problem.

In the remote access deployment described above, a system administrator attempts to diagnose a fault by following a series of manual troubleshooting steps, which are aided by tools that often require a manual interface for any cooperation among the tools. Error messages received by a user unable to authenticate through the RAS server give no troubleshooting information, nor do the event logs. The system administrator may be able to obtain some troubleshooting information if he/she is manually monitoring network traffic. However, network monitoring is a clumsy tool, often providing a limited buffer within which to store data (making it necessary for the system administrator to investigate the error near simultaneously with its occurrence), and making it difficult to effectively filter data.

If the administrator cannot determine which RADIUS proxy server and RAS server formed the pipeline for processing a user inquiry that generated an error, the event logs and error logs on every RADIUS proxy server in the network must be manually reviewed. In the event that event or error logs have information describing the pipeline connection between a RADIUS and RADIUS proxy server, the administrator is able to just check the event logs and error logs on the identified RADIUS server, but he/she may further need to troubleshoot the accessed domain controller (DC). These local event and error logs, however, like the network-based monitoring tools available, suffer from over-inclusiveness and provide only limited buffering capabilities before old entries are overwritten.

There is a need for an automated error detection and diagnostic system that allows network errors in complex architectures such as pipelined server networks to be isolated. Such a system would free the system administrator from the tedious and unreliable task of manually tracking down network errors, and preempt the need for immediate administrator attention.

SUMMARY

The present invention is directed to dissecting the architecture of a network into tiers as illustrated below and then analyzing the signal processing through the tiers in a sequential manner in order to facilitate diagnosis of network errors.

TABLE 1

Remote-Access Servers
(Tier 1)
RADIUS Proxy Servers
(Tier 2)
Primary RADIUS Servers
(Tier 3)
Domain Controllers
(Tier 4)

The present invention further concerns detecting errors in a pipelined network and substantially simultaneously extracting relevant data from every tier in the network in order to facilitate error diagnosis.

According to one aspect of the present invention, periodic attempts are made to communicate with a network of servers such that, if any one of the communications indicates a failure within the network, each tier of servers is queried for the source of the error, stepping through each tier until the failure is isolated.

In one architecture, a group of RAS servers forms a first tier of a pipelined, remote-access network as shown in Table 1, which enables external clients to access internal data by authenticating their identity and forwarding data requests through a RAS. This authentication process implicates four separate tiers of servers in the network through which a request might pass. First, the RAS receives dial-up and virtual private network (VPN) connection requests from external clients. The authentication data (e.g., a user name and a password) received with this request is forwarded to RADIUS proxy servers acting to distribute the requests among the primary RADIUS servers. The primary RADIUS servers then receive the authentication data and compare it to access privileges and information stored on the domain controllers.

In order to troubleshoot a network architecture such as the foregoing pipelined server network, a controller within the network runs a script periodically sending authentication requests to the RAS servers, which form the first tier in the pipeline. When an error message is received by the script, the controller sends a RADIUS authentication request packet to all of the RADIUS proxy servers, which form the second tier of the network. From the point of view of the RADIUS proxy servers, the authentication request packet looks like it is coming from an RAS server processing an authentication request. If each RADIUS proxy server successfully processes the authentication request packet, the controller records data indicating a network error between the particular RAS server which received the authentication request and the second tier of the network comprising the RADIUS proxy servers.

If the error is not at the RAS, then bypassing it as described in the previous paragraph will still cause the error to occur. Upon failure at the RADIUS proxy server tier, a RADIUS authentication request packet is sent from the controller to all of the primary RADIUS servers. If each authentication request delivered directly to the primary RADIUS servers succeeds, the controller records data indicating a network error between the particular RADIUS proxy server that failed and the primary RADIUS servers.

Continuing in the same fashion as described above for the first and second tiers of the network, if the error is not in the RADIUS proxy servers, then it must be in the third or fourth tier of the network, causing the primary RADIUS servers to return an error message. Upon failure at the RADIUS server tier, the controller sends a request to all of the domain controllers in the network, and the time that elapses between request and response (the response time) for each domain controller is measured. Since the primary RADIUS servers will report an error if a domain controller takes too long to respond to their requests, all of the domain controllers must respond within a certain amount of time in a correctly functioning network. If all of the response times measured by the controller are within the range of acceptable values, the domain controllers are functioning correctly, and the controller records data indicating a network error between the particular RADIUS server that failed and the domain controllers. On the other hand, if a response time measured by the controller is outside the range of acceptable values, the controller records data indicating that the fourth tier of domain controllers is the source of network failures. This recorded data is then forwarded to network administrators for investigation.

In this way, the controller parses through the tiers of a pipelined network in order to isolate network failure and report that failure to network administrators.

As an alternative to the sequential analysis of the tiers comprising a complex network, once an error is detected, relevant data is simultaneously captured from every tier, obviating immediate administrator intervention. The captured data comprise network packets, filtered for network data relevant to the failed process, event information stored by the servers, and debugging information stored by the servers during some time interval surrounding the network failure. This captured data, tailored to the detected network failure, is stored on a controller within the network for further analysis by the network administrator, or automated diagnosis. Using the stored data, the network administrator or program can find at what point in the network topology the error occurred, and subsequently work to correct the problem.

In one embodiment of this alternative approach, the pipelined server network is a remote-access authentication network as described above. In such a network, the program embodying the simultaneous data acquisition method, which is located on a controller in the network, monitors the RAS servers and the primary RADIUS servers for error messages. A distributed program on each server in the remote-access network continuously stores recent, filtered network traffic data in memory. Upon detecting a network failure, the controller retrieves information, filtered for relevance with respect to the network failure, from all of the servers in the pipelined network. The information, returned by distributed programs on each server, comprises filtered network data, event information as well as debugging information. This information is then stored in the network for later troubleshooting by a program or the network administrator.

Additional features and advantages of the invention will be made apparent from the following detailed description of illustrated embodiments that proceeds with reference to the accompanying figures.

DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
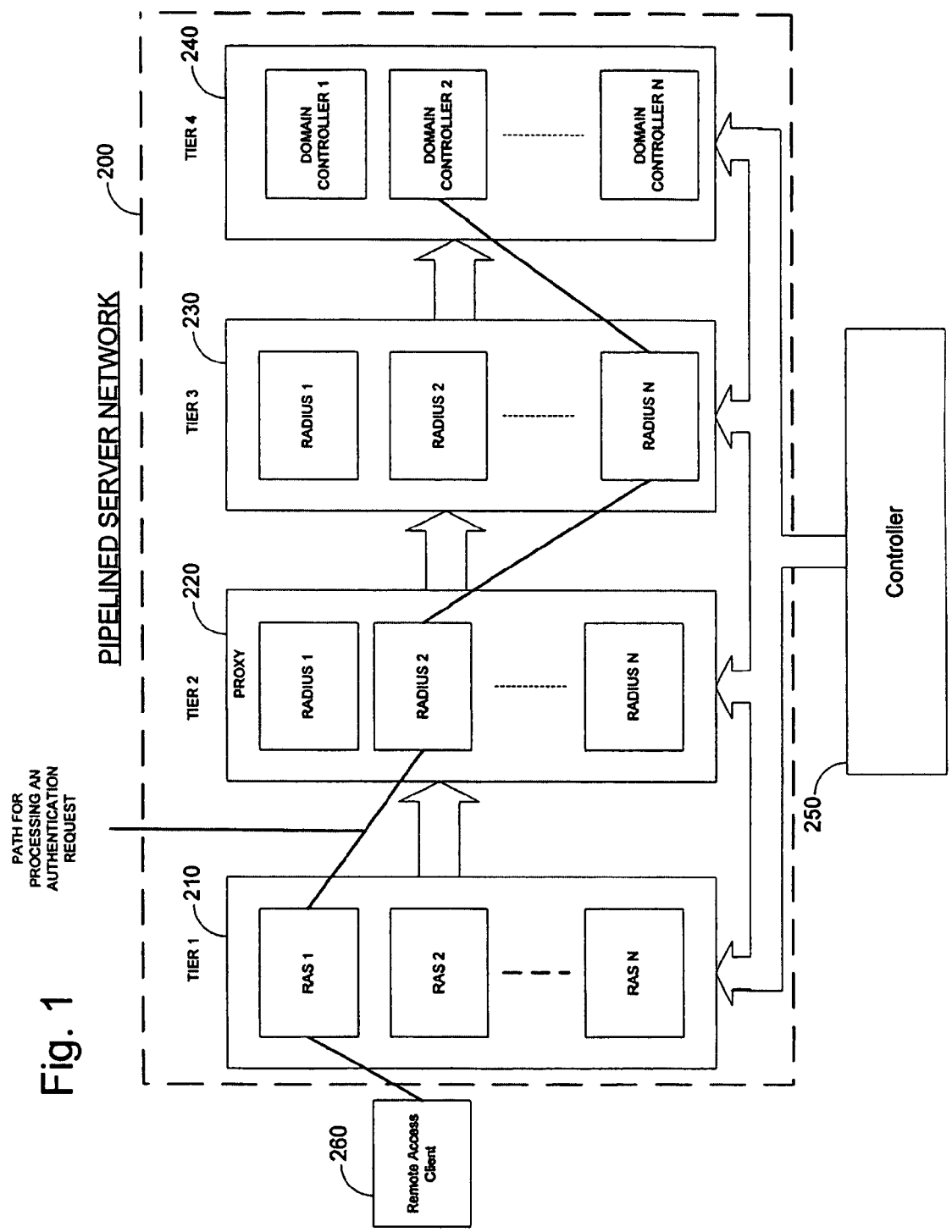
FIG. 1 is a block diagram illustrating an exemplary pipelined remote-access server network architecture including at least one controller.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a computer. Generally, program modules include routines, programs, scripts, objects, components, data structures and the like that perform particular tasks or implement particular abstract data types.

In the following description, the invention is described with reference to acts and symbolic representations of operations performed by one or more computers, unless indicated otherwise. Such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art of computer science and computer engineering. The data structures for maintaining data are physical locations of the memory that have particular properties defined by the format of the data. Although the invention is described in the foregoing context, those of skill in the relevant art will appreciate that various of the acts and operations described hereinafter may also be implemented in hardware.

A pipelined server network comprising at least three functional tiers of servers, e.g. FIG. 1. A tier is a group of one or more servers that perform functionally similar tasks. So, for example, every RADIUS server 230 in the tier 3 is interchangeable. These tiers communicate linearly, such that each tier communicates only with tiers adjacent to it. Thus, in a four-tiered pipelined network like that illustrated, tier 1 communicates with tier 2, tier 2 with tier 1 and tier 3, tier 3 with tier 2 and tier 4, and tier 4 with tier 3. This arrangement provides security and efficiency benefits, but sacrifices ease in troubleshooting network failures. As each server communicates only with servers in immediately adjacent tiers, those errors originating at immediately adjacent tiers are indistinguishable from errors originating at remote tiers.

In accordance with one aspect of diagnosing this network, once a network failure is detected, each tier of servers in the pipelined server network is queried by a program on the network for the source of the error, stepping through each tier until the failure is isolated. Once the program has communicated successfully with each server in a particular tier, the program records data indicating a network failure between the previous tier and the successful tier. This data is then reported to a network administrator for further analysis and corrective measures.

A remote-access network 200, as illustrated in FIG. 1, provides an exemplary architecture for implementing these network failure diagnostics. This network 200 comprises a first tier of remote-access servers (RAS) 210, a second tier of RADIUS proxy servers 220, a third tier of RADIUS servers 230, and a fourth tier of domain controllers (DCs) 240. The RAS servers 210 are servers that enable connections outside the local network 200. These servers 210 receive a dial-up and virtual private network (VPN) connection requests from external remote-access clients 260 desiring access to data within the network. A dial-up connection is initiated by a client 260 using a modem to call directly into a RAS server 210. On the other hand, a VPN connection comprises a set of tunneling protocols by which a client 260 can securely connect to the RAS server 210 and thereby securely access a local network 200 through the insecure Internet. Upon receiving either a dial-up connection request or a VPN connection request, the RAS server 210 requests authentication information from the client 260. This authentication can comprise many different forms of identification, including: a username and password, information regarding the phone number from which the dial-up connection was made, a guest login with no password, voice identification, fingerprint identification, etc. This authentication information is then forwarded to a remote authentication dial-in user service (RADIUS) proxy server 220, using the RADIUS protocol. The RADIUS proxy servers 220 provide a variety of functions within this remote-access deployment. For example, these servers 220 may provide sophisticated load-balancing functionality, distributing authentication requests among the RADIUS servers 230 according to their present request load. These servers 220 can also distribute authentication requests to RADIUS servers outside the local network 200, if the authentication information is stored on external domain controllers.

When the client 260 is connected to the network 200 on which the client's authentication information is stored, the RADIUS proxy server 220 forwards RADIUS authentication packet to a RADIUS server 230 in the third tier. The RADIUS server 230 has more direct access to user account information, indicating the access privileges of a particular user, and can also check remote-access authentication credentials. This user account and authentication information is stored on a separate server, called a domain controller 240. The RADIUS server 230 first authenticates the user with the DC 240 using the information stored in the RADIUS authentication packet, and then uses lightweight directory access protocol (LDAP) to access user account and privilege information stored on the DC 240. This account information (or failure, if no account information is found) is then passed back through the tiers of the remote-access server network, until the RAS server 210 that received the original connection request denies or accepts the request according to the authentication response.

A controller 250 also resides on the local network and coordinates network failure diagnosis. Within the pipelined network environment, the controller 250 initiates direct communication with any tier, imitating the functionality of the preceding tier. In one embodiment, this controller 250 is a separate computer devoted entirely to network error diagnosis. By locating the controller 250 within the network 200, security and access problems that might arise in a remote network diagnostic scheme are obviated.

The network environment of FIG. 1 illustrates an exemplary pipelined networked environment in which the invention can be implemented. However, this invention is not intended to be limited to any particular pipelined network topology. Pipelined architectures with similar characteristics, such as web proxies that forward traffic to certain sites, could also implement the network diagnostics described.

Figure 2:
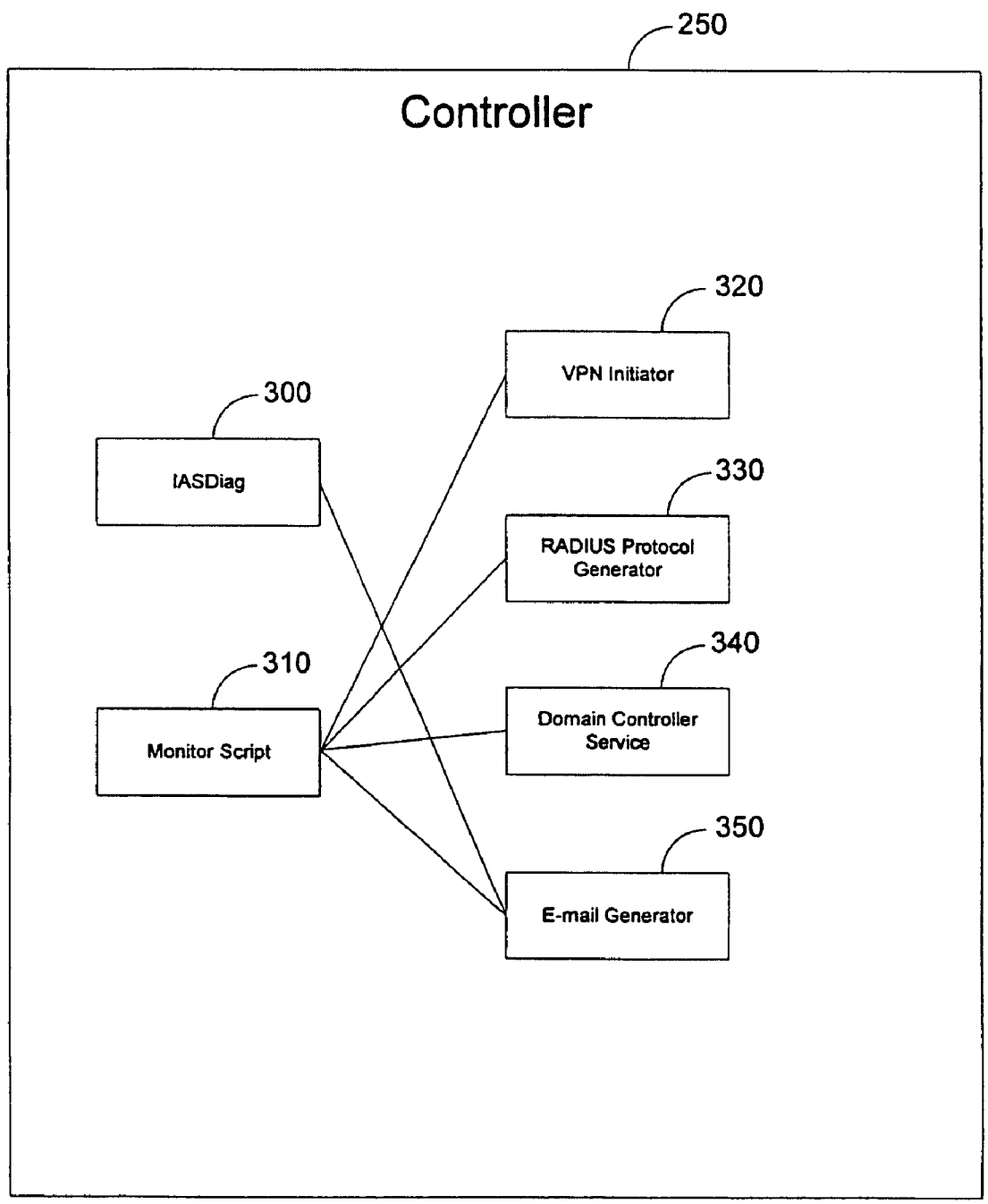
FIG. 2 is a block diagram illustrating an exemplary program structure within the controller.

As shown in FIG. 2, the software structure of the controller 250 comprises a number of different modules providing diagnostic functionality. The monitor script 310 orchestrates network error detection, and the sequential analysis of the remote-access server network as described above. While shown as a script, the monitor script 310 may also be implemented as a program written in a procedural programming language or using object-oriented techniques. To accomplish its network diagnostic tasks, the script 310 exploits existing protocols, and methods of manipulating those protocols. The VPN initiator 320 is one of those protocols, used by the script 310 to generate a properly formed VPN connection request to send to the RAS servers 210. In the Microsoft Windows environment, the functionality of the VPN initiator 320 is implemented in RASDial, although in different environments, different implementations may be used that comply with the VPN protocol requirements. The RADIUS protocol generator 330 is similarly used to generate a properly formed RADIUS authentication request to send to the RADIUS proxy servers 220 and RADIUS servers 230. In the Microsoft Windows environment, the functionality of the RADIUS protocol generator 330 is implemented in RTClient, and in different environments, similar applications might be programmed to comply with the RADIUS server/client specifications. The domain controller (DC) service 340 is analogously used by the script 310 to generate a properly formed user authentication request to send to the DCs 240. In the Microsoft Windows environment, the functionality of the DC service 340 is implemented using the LsaLogonUser API, while in different environments, similar interfaces accessing the DC protocols should be available to implement the DC service 340. Finally, an e-mail generator 350 is used to electronically notify a network administrator when a network error is detected. The functionality of the e-mail generator 350 is implemented using MAPI APIs in the Microsoft Windows environment, and using similar interfaces in different environments.

Figure 3:
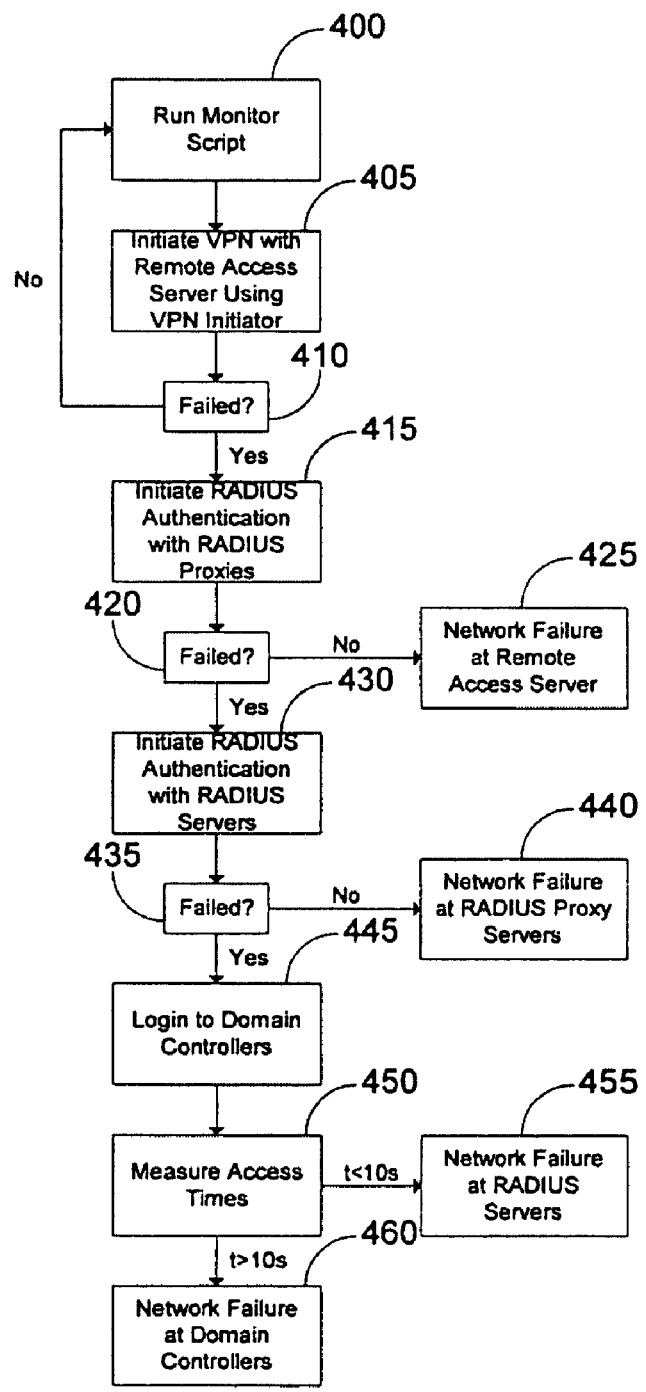
FIG. 3 is a flow diagram illustrating a script function to sequentially analyze a remote-access network to isolate an error.

Referring to flow diagram of FIG. 3, the initial step 400 of running the monitor script 310 is performed manually by a network administrator, or the script may be automated to run independently at some predetermined time interval. If automated, the monitor script 310 may, in one exemplary implementation, be run more often when the network is less busy. There are benefits to this implementation. First, when the network is busy serving actual clients, many network failures will be detected using other techniques. In addition, a network administrator might decide that an extra burden should not be placed on the network at these critical times. Finally, by running the script more often when the network is less busy, network failures are detected before critical loads are placed on the system, allowing errors to be corrected before clients suffer.

Regardless of how the running of the monitor script 310 is initiated, at step 400, at step 405, the monitor script 310 uses the functionality of the VPN initiator 320 module to initiate a VPN with an RAS server 210. Although this VPN connection is not tunneling over the Internet, the VPN initiator 320 uses the tunneling protocols to create a secure connection between the server 210 and the controller 250, which fools the RAS server 210 into thinking a remote client is attempting to authenticate itself. To ensure that every RAS server in the first tier is functioning correctly, there are alternative implementations. In one implementation, the VPN initiator 320 initiates a VPN with all of the RAS servers 210 in the first tier. In other words, each time the monitor script is run 400, the monitor script 310 checks every RAS server 210 for network failure. In another, less resource intensive alternative, the VPN initiator 320 initiates a VPN with a different RAS server 210 each time, until every RAS server 210 has been checked, and then the script repeats. Referring to FIG. 1, a VPN is first initiated with RAS server 1, then with RAS server 2, and so on until a VPN has been initiated with RAS server n at which point the cycle resets. This implementation ensures that every RAS server 210 will be checked for network failure. However, in a remote-access network with some number, n, of RAS servers 210, each RAS server will be checked only one out of every n number of monitor script executions 400. In the least resource intensive, but least rigorous, alternative, the VPN initiator 320 initiates a VPN with a different RAS server 210 randomly. In general, every RAS server would have a probability 1/n of being accessed in a particular monitor script execution 400.

The VPN initiator 320 sends authentication information to the RAS server 210 as part of step 405. This authentication information comprises inter alia a user name and password. In one embodiment, this user name and password is intended simply for network diagnostic use by the controller 250. It can also be an actual user's name and password, used, for example, because the user is having problems logging into the system remotely. In alternative implementations, this authentication information may comprise the use of: smart cards, certificates, one-time passwords, token cards, automatic number identification and guest authentication. Using any of these authentication methods, the monitor script 310 through the VPN initiator 320 sends properly formed authentication information to the RAS server 210. In response to this VPN connection request, the RAS server grants access, or generates a failure message 410. If the connection is granted, the monitor script 310 disconnects and returns to step 400. If there is a connection failure, however, the monitor script continues to step 415.

Having detected a failure in the remote-access network, the monitor script 310 uses the functionality of the RADIUS protocol generator 330 to generate RADIUS authentication requests to send to RADIUS proxy servers 220 in step 415. From the point of review of the RADIUS proxy servers 220, these RADIUS requests appear to originate at one of the RAS servers 210 within the network. Thus, the monitor script 310 sends the same authentication information sent via the VPN initiator 320 to the RAS server 210 directly to the RADIUS proxy servers 220 in RADIUS protocol format. In alternative implementations, these RADIUS authentication requests may be sent to all of the RADIUS proxy servers 220 in the second tier, or just sent to the RADIUS proxy server 220 with which the remote-access server 210 formed the pipeline for processing the initial request that generated the error. In response to these RADIUS authentication requests, the RADIUS proxy server or servers 220 respond successfully, returning information regarding the particular user's access characteristics, or respond with an error message, indicating that failure has occurred at some point farther along the pipelined network 200.

If all the RADIUS proxy server authentication requests succeed, at step 425, the monitor script 310 records information indicating a network failure between the RAS server 210 that received the initial VPN request and the second tier. This information is recorded in a simple text file, in an e-mail message generated and sent to the system administrator by the e-mail generator 350, or in some other proprietary format. The information recorded comprises: the date and time of the failure, the address and other hardware information identifying the RAS server, the address and other hardware information identifying the RADIUS proxy server with which the RAS server communicated, the user name and password used to generate the failure, the address of the controller running the monitor script, copies of the messages sent to the RAS server and those sent to the RADIUS proxy servers, and other information as needed in the particular implementation. After recording information regarding the failure, the monitor script resets at step 400.

However, if the error is not at the RAS servers, then bypassing it as described above will still cause the error to occur. Upon detecting a RADIUS proxy server 220 failure, the monitor script 310 again uses the functionality of the RADIUS protocol generator 330 to generate RADIUS authentication requests to send to the RADIUS servers 230 in step 430. These RADIUS authentication requests are identical to those requests sent to the RADIUS proxy servers 220 in step 415. These RADIUS authentication requests may be sent to all of the RADIUS servers 230 in the remote-access network 200, to the RADIUS server 230 that formed the pipeline for processing the original failed authentication attempt, or to the RADIUS server 230 that formed the pipeline for processing the authentication attempt that failed in step 415. At step 435, in response to these RADIUS authentication requests, the RADIUS server or servers 230 respond successfully, returning information regarding the particular user's access characteristics, or respond with an error message, indicating that failure has occurred at some point farther along the pipelined network 200.

If all of the RADIUS server authentication requests succeed, the monitor script 310 records information indicating a network failure between the RADIUS proxy servers 220 that failed in step 415 and the third tier, step 440. This information is recorded using any of the methods outlined above with respect to step 425. After recording this failure information, the monitor script resets, at step 400.

However, if the error is not at the RADIUS proxy servers, then bypassing it as described above will still cause the error to occur. Upon detecting a RADIUS server failure, the monitor script 310 uses the functionality of the domain controller service 340 to generate a properly formed user authentication and information request to send to the domain controllers 240 in step 445. These DC requests perfectly mimic the requests sent by RADIUS servers 230 in the network 200. The information sent in these DC requests comprises the same user and password information sent in the original failed VPN connection request at step 405. In alternative implementations, these DC requests may be sent to every DC 240, to the DC 240 that formed the pipeline for processing the original failed VPN connection request, or the DC 240 that formed the pipeline for processing the authentication attempt that failed in step 430. Having sent the DC request, the monitor script measures the time it takes for the DC to return the information requested as shown in step 450. In the remote-access network described, if a RADIUS server 230 does not receive a reply to a DC access request within a predetermined time interval, it automatically registers a network failure and returns an access denied response to the client. Therefore, if the monitor script determines that a DC 240 is taking longer than that predetermined time interval to respond, the DC is a possible source of the network failure. In one implementation, the predetermined time interval is 10 seconds. If the DC 240 returns the information requested within 10 seconds, the access has succeeded, otherwise the access has failed.

If all of the DC requests succeed, the monitor script 310 records information indicating a network failure between the RADIUS servers 230 that failed in step 430 and the domain controllers 240, step 455. This information is recorded using any of the methods outlined above with respect to step 425. After recording this failure, the monitor script resets at step 400.

On the other hand, if a DC request fails, the monitor script 310 records information indicating a network failure at the DC 240, step 460. This information comprises that recorded in step 425, as well as the time taken for the DC's failed response. After recording this failure, the monitor script resets at step 400.

As an alternative to the sequential analysis of the network, a program is also contemplated that substantially simultaneously requests relevant, timely information from every tier of servers in a pipelined server network upon detection of a network failure. The information requested comprises network traffic, event information and debugging information. The program then records this data for subsequent analysis.

Referring again to FIG. 1, from the controller 250, a program, IASDiag, 300 monitors the remote-access servers 210 and the RADIUS proxy servers 230 for network errors, and also orchestrates communication with the various tiers of the network upon error detection. While shown as a program, IASDiag 300 can be implemented as a script, or by other analogous programming methods well-known in the art. There are also distributed agents running on each server of the network 200 that return relevant information to IASDiag 300. In alternative implementations, IASDiag 300 might be located on one of the preexisting servers within the pipelined server network, or on many of them in a distributed software architecture. Similarly, the distributed agents might be consolidated into a single program that can access information from every server in the network from a single machine.

Figure 4:
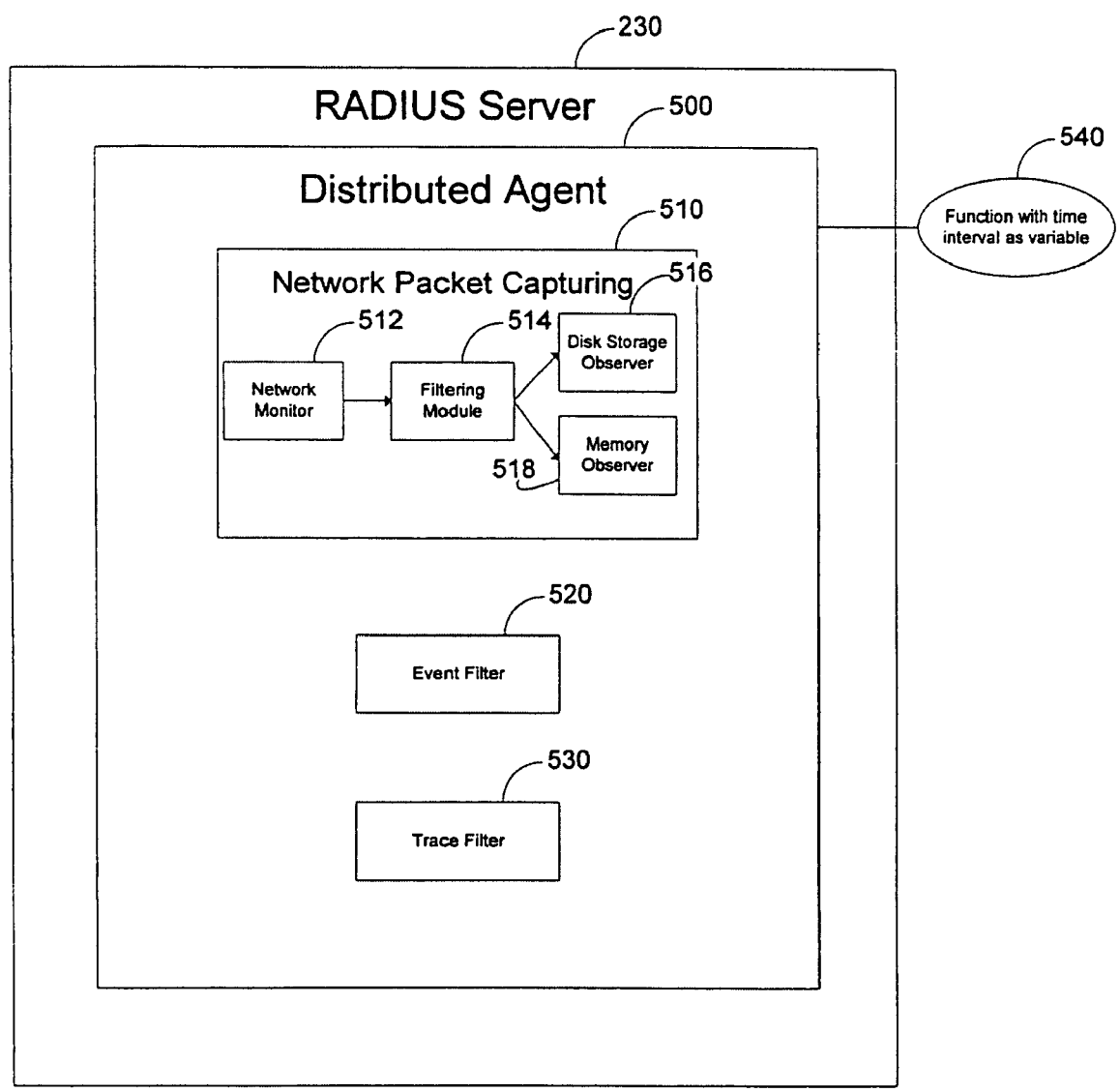
FIG. 4 is a block diagram illustrating an exemplary program structure within the RADIUS server.

As shown in FIG. 4, in one embodiment, the RADIUS server 230 has a distributed agent 500 running on it. This distributed agent 500 has four functions: filtering and capturing network traffic, filtering and capturing event data, filtering and capturing debug data and returning compiled information upon request. Its first function is to capture relevant network traffic to provide a log of recent network broadcasts 510. To accomplish this, the agent exploits and extends the functionality of existing network monitoring tools, well known in the art, such as Netmon 512, the implementation in the Microsoft Windows environment, or libpcap, an implementation in the Unix and Linux environments. There are many commercial and non-commercial software tools that offer similar functionality. Existing network monitoring tools have limited utility: having no filtering capabilities, and writing to one file that is constantly overwritten with new data. The output of Netmon 512 is therefore sent through a filtering module 514, which extracts data most relevant for isolating a network error. In order to extract relevant data, the filtering module 514 is able to parse through the unfiltered network packets received by the network monitoring tool 512, extracting information from the packets' headers. These headers include information regarding the Internet protocol (IP) used to send the packet, and the IP address and port to which the packet was sent. In one implementation, the filtering module 512 then filters and stores the packets according to which are ping requests and responses, ICMP error messages, RADIUS packets, and traffic to and from DCs. In other implementations, different relevant data can be stored to facilitate network diagnosis. This filtered data is then simultaneously sent to two "observers," a disk storage observer 516, and a memory observer 518. An "observer," as is known by those skilled in the art, stores data output by another program. Thus, the disk storage observer 516 records the filtered data output by the filtering module 514 into long-term files for later use. This filtered data takes up less room than the unfiltered data, and therefore facilitates long-term access and saves disk space. The disk storage observer 516 also implements a double buffering algorithm to prevent data overwriting, and to prevent packet loss. In this double buffering algorithm, the disk storage observer 516 writes to a certain file for a period of time, e.g. one hour. At some point close to the end of that time period, e.g. two minutes before the end of the hour, a new file is created by the disk storage observer 516, and data is written to both the new file and the old file until the end of that time period., e.g. that initial one hour. The disk storage observer 516 then closes the old file for later access and writes to the new file for some period of time, e.g. one hour, until near the end of that time period, e.g. two minutes before the end of the hour, when the next file is created, and so on. While there is the possibility of data duplication, this double buffering ensures that no packet data crucial to dissecting a network error is lost. The memory observer 518 continuously stores network traffic to faster, but more limited memory. The size of the memory allocated to the memory observer 518 is limited to some time interval or to some amount of network traffic information. In one implementation, the memory observer 518 will have the last hour of filtered network traffic stored for immediate access, and the disk storage observer 516 will have recorded the last day of filtered network traffic for longer-term access.

The second function of the distributed agent is to provide filtered event messages using the event filter 520. When prompted, the event filter 520 accesses event logs, implemented differently on particular servers and filters the data for events occurring within a specific time interval and for those events relevant to a RADIUS failure. As implemented in the Microsoft Windows environment, the event filter 520 uses the Windows Management Interface (WMI) APIs provided by Windows to retrieve event records that are filtered according to specific criteria using WMI Query Language (WQL). The event filter 520 can then further filter these records to isolate relevant events, prior to storing these records in data files. As is well known in the art, other environments provide similar event logging mechanisms, such as syslogd in the Unix environment, which can then be accessed and the results filtered by the event filter 520 according to the particular implementation.

The third function of the distributed agent is to provide filtered debug trace files 530. Similar to the functionality provided by the event filter 520, the trace filter 530, when prompted, accesses the debug trace files stored by existing programs and filters the data for debug entries created within a specific time interval. In the Microsoft Windows environment, the debug trace files created by debugging programs have a standard formatting for line entries, beginning with a time and date field, facilitating time interval filtering. Those entries that occur within a certain time interval can easily be extracted by the trace filter and written to a data file for subsequent analysis. In one implementation, the debug trace files are also filtered to isolate those debug entries that are related to the network failure.

The fourth, and final, function of the distributed agent is to provide its underlying functionality to a program requesting information 540. In one implementation, the distributed agent 500 receives a request for information along with a time interval. In response, the distributed agent 500 returns information from the network traffic monitoring module 510, the event filter module 520 and the trace filter module 530 in data files. These data files comprise filtered network packets, events and debug traces from the time interval specified.

Figure 5:
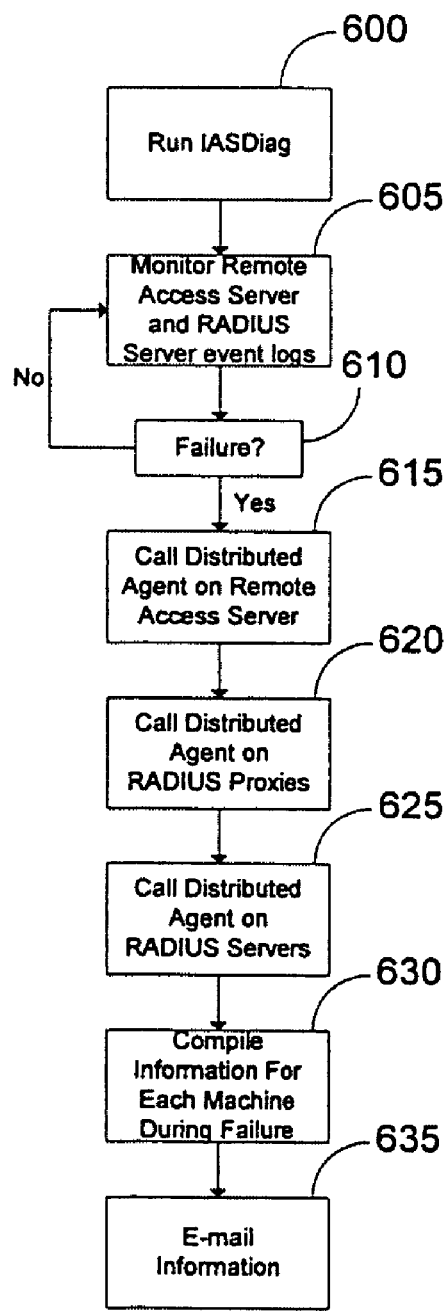
FIG. 5 is a flow diagram illustrating a script functioning to substantially simultaneously request information from the remote-access network in response to an error.

The following is meant to illustrate the logical flow of the process as implemented in the present invention with reference to FIG. 5. In step 600, the program 300 is run on the controller 250. In many implementations, the program 300 is constantly running as a background process on the remote-access network 200. Alternatively, it may only be run when there is a strong possibility of network failure, for example, after reports of network failures are made by users, or after the monitoring script 310 has reported a network failure.

The program's 300 initially monitors the RAS servers 210 and RADIUS servers 230 for errors, step 605. In one implementation, these errors are first recorded on the RAS and RADIUS server event logs, which are then periodically checked by the program 300. In another implementation, a program resident on the RAS and RADIUS serves notifies the program 300 of an error immediately after the error takes place. An error is any failed attempt to authenticate a user, including the failed attempt of the controller 250 to initiate a VPN with a RAS server 210 from within the network 200 according to the first method of the present invention. If the failure is initiated by the controller 250, the two aspects of the present invention work in concert to compile relevant information for subsequent analysis. As long as there is no failure, the program 300 continues to monitor the RAS and RADIUS servers for errors, step 610.

Once the program 300 detects an error, steps 615 through 625 are executed substantially simultaneously, and the requests made in each step are very similar. In step 615, the program 300 sends a request to the distributed agent on the RAS server 210 that formed the pipeline for processing the user inquiry that generated an error, or, if that information is unavailable, to all RAS servers 210. In step 620, the program 300 sends a request to the distributed agents on all RADIUS proxy servers 220. Finally, in step 625, the program 300 on the controller 250 sends a request to the distributed agents on all RADIUS servers 230 in the network. In one embodiment, these requests include information regarding the relevant time interval. The distributed agents then return data files or pointers to data files containing filtered network traffic, events and debug trace files from that time interval.

The data files returned by the distributed agent 500 need not be stored on any particular computer in the network 200. They may be stored on the distributed agent's server, and a pointer may be passed back to the controller 250; they may be stored on the controller 250 for subsequent analysis; or they may be stored in some other centralized location. The only requirement of these data files is that they be available for subsequent analysis. The distributed agents also need not receive a time interval as a variable. If the network 200 is sufficiently dependable, there will be very little lag between detection of a network failure and requests for information from the distributed agents. The distributed agent 500 then returns information from some time before the request through the time of the request.

Once the relevant data files have been stored, this information is compiled for later access 630. For this purpose, a file is created indicating the time and location of the detected failure, and pointers to all of the servers' returned data files. This file is then analyzed by a human or automated process. In one embodiment, the information encoded in this file is sent to a network administrator for subsequent analysis. Alternatively, an automated process parses through the server data files looking for specific addresses and tags indicating the failure and success of different communications. By following a particular network communication from the point at which failure was detected to the point at which a packet is lost, the automated process can isolate the most probable locations in the network 200 for network failure.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A diagnostic tool in a pipelined network comprising tiers of servers wherein each tier of servers communicates only with adjacent tiers in a communications flow that processes messages in a sequence of the tiers, the tool comprising:

a controller located locally with respect to the pipelined network for generating a diagnostic message to he processed by the pipelined network;

communication paths connecting the controller to each tier of the pipelined network; and a program executing at the controller for detecting a failure of the processing of the diagnostic message by the pipelined network and receiving diagnostic information from the tiers in the pipelined network after the failure is detected.

2. The diagnostic tool of claim 1 wherein the program includes commands responsive to the detection of the network failure for sequentially analyzing each tier in the pipelined network in order to isolate the tier in which the failure occurred.

3. The diagnostic tool of claim 1 wherein the program includes commands for substantially simultaneously requesting information from each tier upon network failure.

4. The diagnostic tool of claim 3 including distributed agents at all of the tiers that gather information about the operating of the tier at the time of network failure.

5. A method for diagnosing failures in a pipelined network comprising processing tiers wherein each tier communicates only with adjacent tiers in a communications flow that proceeds sequentially from one tier to another, said method comprising:

detecting a failure communicating a diagnostic message through the tiers of the pipelined network;

automatically capturing data at each tier describing processing at the tier at the time of failure tailored to, provide diagnostic information; and analyzing the data to isolate the failure to one of the tiers.

6. The method of claim 5 including the step of orchestrating distributed agents resident at each of the tiers to capture the data at complementary time periods.

7. The method of claim 5 wherein the pipelined server network is a remote access network.

8. A computer-readable medium, having computer-executable instructions for diagnosing network errors in a pipelined network comprising tiers of servers wherein each tier of servers communicates only with adjacent tiers in a communications flow that processes messages in a sequence of the tiers, the computer-executable instructions performing steps comprising:

generating a diagnostic message to be processed by the pipelined network;

detecting a failure of the processing of a diagnostic message by the pipelined network;

communicating directly with each tier of the pipelined network through a local communication path; and retrieving diagnostic information from each of the tiers in the pipelined network after the failure is detected.

9. The computer-readable medium of claim 8, wherein the computer-executable instructions for retrieving diagnostic information further comprise computer-executable instructions for sequentially analyzing each tier in the pipelined network in order to isolate the tier in which the failure occurred.

10. The computer-readable medium of claim 8, wherein the computer-executable instructions for retrieving diagnostic information further comprise computer-executable instructions for substantially simultaneously retrieving diagnostic information from each tier upon failure.

11. A computer-readable medium, having computer-executable instructions for diagnosing failures in a pipelined network comprising processing tiers wherein each tier communicates only with adjacent tiers in a communication flow that proceeds sequentially from one tier to another, the computer-executable instructions performing steps comprising:

detecting a failure communicating a diagnostic message through the tiers of the pipelined network; and retrieving data automatically captured at each tier describing processing at the tier at the time of failure, said data tailored to provide diagnostic information.

12. The computer-readable medium of claim 11, wherein the computer-executable instructions for retrieving data automatically captured at each tier further comprise computer-executable instructions for interacting with distributed agents resident at each of the tiers to capture the data at complementary time periods.

* * * * *

UNITED STATES PATENT AND TRADEMARK OFFICE
CERTIFICATE OF CORRECTION

| | | |
|---|---|---|
| PATENT NO. | : 7,487,384 B2 | Page 1 of 1 |
| APPLICATION NO. | : 11/953814 | |
| DATED | : February 3, 2009 | |
| INVENTOR(S) | : Thirumalesh Bhat et al. | |

It is certified that error appears in the above-identified patent and that said Letters Patent is hereby corrected as shown below:

In column 12, line 66, in Claim 1, delete "he" and insert -- be --, therefor.

Signed and Sealed this
Third Day of May, 2011

David J. Kappos
*Director of the United States Patent and Trademark Office*